C. H. THORDARSON.
ELECTRIC SWITCH.
APPLICATION FILED JUNE 27, 1910.
1,000,052.
Patented Aug. 8, 1911.
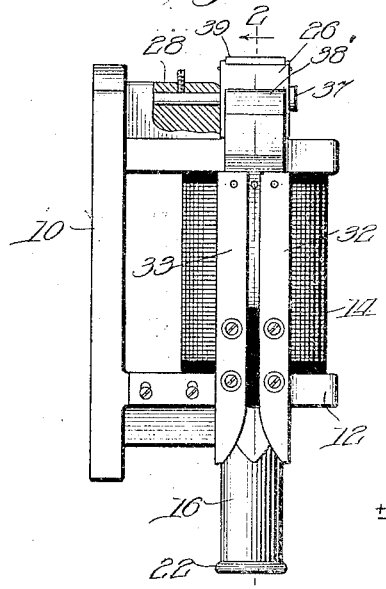
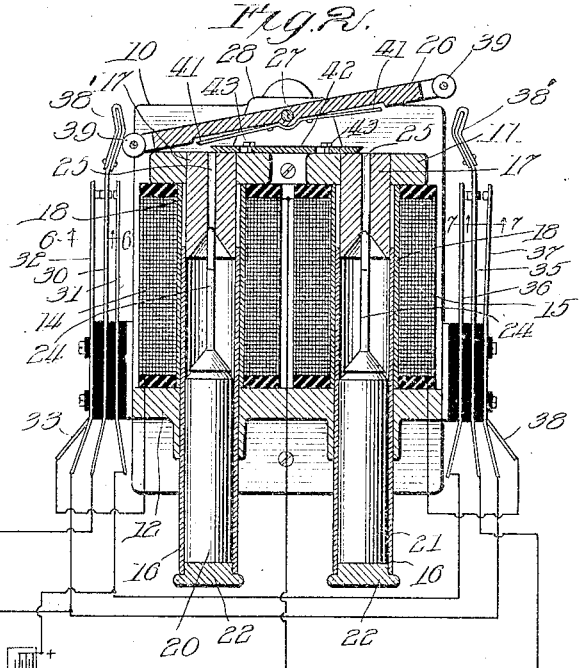
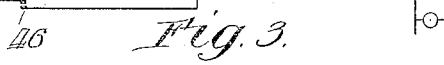
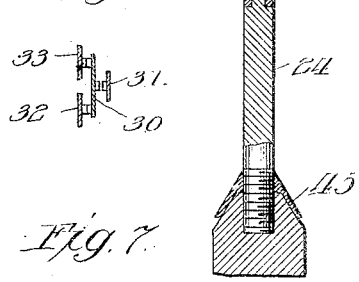
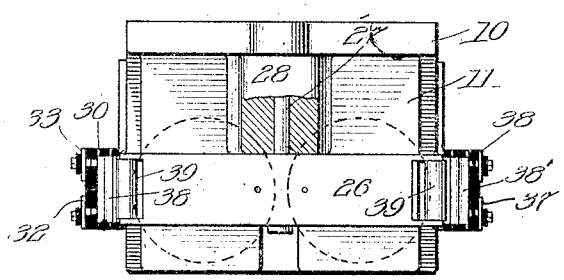
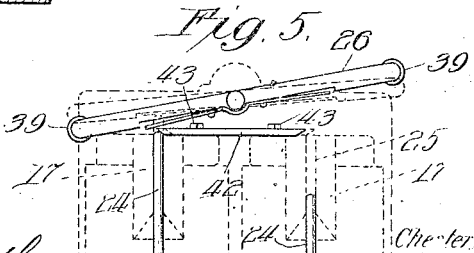
Witnesses:
Harry S. Gaither
William Goldberger
Inventor,
Chester H. Thordarson
by William L. Hall
atty

UNITED STATES PATENT OFFICE.

CHESTER H. THORDARSON, OF CHICAGO, ILLINOIS.

ELECTRIC SWITCH.

1,000,052.　　　　Specification of Letters Patent.　　Patented Aug. 8, 1911.

Application filed June 27, 1910.　Serial No. 569,047.

*To all whom it may concern:*

Be it known that I, CHESTER H. THORDARSON, a citizen of the United States, and a resident of Chicago, in the county of Cook and State of Illinois, have invented certain new and useful Improvements in Electric Switches; and I do hereby declare that the following is a full, clear, and exact description thereof, reference being had to the accompanying drawings, and to the characters of reference marked thereon, which form a part of this specification.

This invention relates to improvements in electric switch mechanisms adapted to automatically control the flow of electric current from a circuit to a plurality of electrical devices in the circuit and which are adapted to be separately connected in said circuit.

The form of switch herein shown has been adapted more particularly for use in a storage battery power equipment for automatically switching the charged batteries from the charging circuit to the load circuit and simultaneously switching the partially discharged batteries from the load to the charging circuit so that the latter batteries may be charged while current is supplied to the load circuit by the battery previously charged. Such an apparatus is shown in my co-pending application for United States Letters Patent, Serial Number 569,046 filed of even date herewith. The switch may, however, be employed for other uses.

As shown in the drawings, Figure 1 is a side elevation partially broken away, of a switch mechanism embodying my invention. Fig. 2 is a vertical section thereof, on line 2—2 of Fig. 1. Fig. 3 is a top plan view, partially broken away. Fig. 4 is a sectional detail of one of the reversible switch arm actuating plungers. Fig. 5 illustrates in full and dotted lines the manner of throwing over the reversible switch arm. Fig. 6 is a detail section on line 6—6 of Fig. 2, looking upwardly. Fig. 7 is a detail section on the line 7—7 of Fig. 2, looking upwardly.

The cast iron supporting base 10 of the switch mechanism is provided with upper and lower pole pieces 11, 12, respectively.

14, 15 designate coils arranged side by side between the pole pieces and mounted on brass tubes 16, 16 which extend upwardly through openings in the lower pole piece 12. The upper pole piece 11 is provided with pole extensions 17 which extend downwardly into the upper ends of the hollow coils and a distance in said tubes 16. The said coils are wound on brass tubes 18, 18 which fit closely over the tubes 16.

20, 21 designate plunger cores which are contained in said tubes 16, the latter being closed at their lower ends by plugs 22. The said cores are made of soft iron and are provided at their upper ends with reduced extensions 24 which extend upwardly into axial openings 25 in the pole extensions 17. The said extensions are adapted to alternately engage a pivoted switch arm 26 when the coils are alternately energized to raise the plungers so as to swing said switch arm from one side to the other about its horizontal pivot pin 27. Said pivot pin 27 is mounted in an extension 28 of the upper pole piece.

The coils 14, 15 are adapted to be alternately energized by suitable connection in an electric circuit or circuits, and as each coil is separately energized, its plunger is drawn upwardly so as to raise its extension into contact with the reversible switch arm 26 and throw said arm from one side to the other; the arm being thus thrown or swung alternately from one side to the other as the coils are alternately energized.

Arranged at the opposite sides of the magnet frame, and insulated therefrom and from each other, are two sets of spring switch terminals, there being four terminals in each set. The terminals of one set, or those at the left hand side of the switch are designated by 30, 31, 32 and 33. The terminals of the other set are designated by 35, 36, 37 and 38. The said terminals are provided at their upper ends with contact points through which the circuits are closed from terminal to terminal. The terminals 32, 33 of one set, as well as the terminals 37, 38 of the other set, are arranged one in front of the other and the central terminal of each set is sufficiently broad to bridge the adjacent separated terminals so as to simultaneously close circuits through each central terminal and its adjacent separated terminals.

The central terminals 30, 35 of the sets are extended above the other terminals in line with the switch arm 26 and are provided with contact pieces 38', 38' adapted for contact by the rollers 39, 39 carried by the outer ends of the switch arm 26. Said central terminals constitute master terminals and when unrestrained tend to spring inwardly with their points in contact with the points of the inner springs of the sets, as shown at the right hand side of Figs. 2 and 3. The engagement of the bearing roller 39 at either end of the switch arm 26 with the contact piece 38 of the adjacent master terminal forces said terminal outwardly with its contact pieces engaged with the contact pieces of the outer terminals, this being the position of the terminal as shown at the left hand side of Figs. 2 and 3. At this time the contact point of the other central or master terminal 35 is engaged with the contact point of the inner terminal 36. The upper ends of the contact pieces of the master terminals are inclined outwardly so as to afford an easy movement of the rollers thereon when the ends of the switch arm are depressed to force the terminals outwardly. Below said outwardly inclined upper ends of the contact pieces, they are reversely inclined to furnish oblique shoulders to engage over the rollers 39 to lock the switch arm into either of the positions into which it is thrown.

When either of the coils 14 or 15 is energized, it draws its plunger core 20 or 21 upwardly, and the extension 24 of the plunger strikes the pivoted switch arm 26 and throws it over to reverse its position, disengaging one of the central or master terminals and engaging the other so as to reverse the positions of the switch. Instead of engaging the switch direct, the plunger extensions preferably engage spring buffers 41 formed by the ends of a flat or leaf spring that is attached centrally to the arm. Thus the blow or impact of the plunger is cushioned with the result of prolonging the life of the arm.

In order to prevent one of the plungers rising sufficiently to engage the swinging switch arm at a time when the other plunger is in its upper position, should both coils be simultaneously energized, I may provide the sliding stop plate 42 that is arranged with its ends adapted to extend over the axial openings in the pole extensions 17 and is beveled at its ends so that when engaged by the upper end of one of the plunger extensions, it is thrown endwise into the path of the other plunger extensions, and vice versa. The said stop plate is guided in its endwise movement by screws 43 which extend down through slots in the plate and into the pole piece 11. The plunger extensions, which will usually be made of brass, are shown as provided with hard metal tips 44 attached thereto in the manner shown in Fig. 4. Said extensions are shown as being screw-threaded at their lower ends to engage axial screw-threaded sockets in the upper ends of the plunger bodies whereby the parts are attached together. In order to enlarge the faces of the plungers and pole extensions and to increase the tractive force to raise the plungers, and also to decrease the air gap between the plungers and pole pieces, relatively to the fixed extent of movement thereof, the upper ends of the plungers are made convexly conical and the lower ends of the pole extensions are formed with corresponding recesses to receive the conical plungers. I may provide the faces of the plungers with shields 45, made of brass, or like material, to prevent the plungers sticking in their upper or raised positions.

In the use of the switch mechanism in a storage battery charging and power equipment, such as is disclosed in my aforesaid application, the central or master terminal at one side of the switch, as, for instance, the terminal 30, may be connected to the positive side of the charging circuit and the adjacent inner and outer terminals 31, 32 connected with the positive sides of the storage batteries. The central or master terminal 35 at the other side of the switch may be connected to the positive side of the load circuit and the adjacent inner and outer terminals 36, 37 connected with the positive sides of the batteries.

When the parts are so connected and arranged, one of the batteries will be connected in the charging circuit through one of the terminals 31 or 32 at the left hand side of the switch, and the other battery will be connected to the positive side of the load circuit through one of the terminals 36 or 37 at the right hand side of the switch. When the switch arm 26 is thrown over to its other position, the battery theretofore in the charging circuit will be connected to the positive side of the load circuit through one of the terminals 36 or 37 at the right hand side of the switch, and the battery theretofore in the load circuit will be connected to the charging circuit through one of the terminals 31 or 32.

The terminals 33 and 38 at the outer sides of the sets of terminals are for the purpose of controlling the divided circuit in which the coils 14 and 15 are included, each of said latter terminals being connected to its adjacent coil 14 or 15 and the coils being connected by a common return wire to the negative side of the charging circuit, said return wire having a circuit closing device 46, corresponding to the meter controlled relay shown in my aforesaid application. When the parts are in the position shown in Figs. 2 and 3 and the circuit closing device is closed, a circuit is closed through terminals 30, 32, 33 and coil 14 to actuate the plunger 20 to throw the switch arm over to its reverse position and shift the batteries in the charging and load circuits. When the switch is again to be reversed the switch controlling circuit will be closed at 46 through terminals 37 and 38 and coil 15 to actuate the plunger.

While the switch mechanism has been shown as adapted to and has been described as arranged for the storage battery power and charging equipment disclosed in my aforesaid application, it is to be understood that the essential features of the construction are adaptable to other uses for controlling the operation of electrical devices in electrical circuits. The invention is not limited, therefore, to the specific details herein illustrated except in claims where such details are specifically set forth.

I claim as my invention:—

1. An electric switch comprising electro-magnetic coils adapted to be alternately energized, a switch arm pivoted between its ends, means responsive to said coils adapted to act on said arm to swing it first in one direction and then in the other, and two sets of circuit closing terminals each embracing a master terminal and other terminals adapted to be alternately connected to the master terminal, the master terminals of the two sets being alternately acted upon by said switch arm.

2. An electric switch comprising two coils adapted to be alternately energized, plungers reciprocable in said coils, a switch arm pivoted intermediate its ends at a point between the coils and unattached to the plungers, and adapted by impact of the plungers to be swung on its pivot, and two sets of circuit closing terminals arranged one at one end and the other at the other end of said arm, each embracing a master terminal adapted to be engaged by the adjacent end of said arm.

3. An electric switch comprising two coils adapted to be alternately energized, plungers reciprocable in said coils, a switch arm pivoted intermediate its ends at a point between the coils, one end of which is engaged by one plunger and the other end by the other plunger to swing said arm on its pivot, and two sets of circuit closing terminals arranged at the ends of said arm, each comprising a master terminal adapted to be engaged by the adjacent end of said arm and other terminals adapted for alternate contact with the master terminal, the ends of said master terminals being shaped to automatically lock the switch arm in positions into which it is swung by said plungers.

4. An electric switch comprising two electro-magnetic coils adapted to be alternately energized, two sets of circuit closing spring terminals each embracing a central or master terminal and two side terminals adapted to be connected in outer working circuits, the center terminal of each set being adapted to be alternately connected to the side terminals of that set, means responsive to said magnets for alternately actuating the central or master terminals, and another terminal in each set adapted for contact with its central or master terminal and through which other terminal the circuits to energize the magnets are adapted to be alternately closed.

5. An electric switch comprising an iron frame having pole pieces, two coils between said pole pieces and adapted to be alternately energized, plungers reciprocable within said coils and having reduced ends, one of the pole pieces being provided with hollow pole extensions which extend into the adjacent ends of the coils and through which the reduced ends of the plungers extend, a pivoted switch arm alternately acted upon by said plungers and switch closing devices controlled by said switch arm.

6. An electric switch comprising an iron frame having pole pieces, two upright coils between said pole pieces and adapted to be alternately energized, tubes extending upwardly through one of the pole pieces and into said coils, and having plunger supports at their lower ends, plungers in said tubes and coils and reciprocable under the influence of the coils and normally resting on said supports, a pivoted switch arm arranged to be acted upon alternately by said plungers and circuit closing means controlled by said switch arm.

7. An electric switch comprising an iron frame having pole pieces, two coils between said pole pieces and adapted to be alternately energized, tubes extending through one of the pole pieces and into said coils, plungers in said tubes and coils and reciprocable under the influence of the coils, the other pole piece being provided with hollow pole extensions which extend into the adjacent ends of said coils and through which the ends of the plungers extend, a pivoted switch arm arranged to be acted upon alternately by the latter ends of said plungers and circuit closing means controlled by said switch arm.

8. An electric switch comprising two coils adapted to be alternately energized, plungers reciprocable in said coils, a switch arm pivoted between its ends and acted upon alternately by said plungers, circuit closing means controlled by said switch arm, and means controlled by each plunger for preventing the operation of one plunger when the other plunger is in position to operate said switch arm.

9. An electric switch comprising an iron frame having upper and lower pole pieces, two coils between said pole pieces and adapted to be alternately energized, a switch arm pivoted between its ends above said coils, plungers reciprocable in said coils and adapted to alternately strike the said switch arm to reverse the same, a stop plate adapted at each end for engagement by one of the plungers to shift the other end into the path of the other plunger and circuit closing terminals adapted to be controlled by said switch arm.

10. An electric switch comprising an iron frame having pole pieces, two coils between said pole pieces and adapted to be alternately energized, plungers reciprocable within said coils and having reduced ends, one of the pole pieces being provided with hollow pole extensions which extend into the adjacent ends of the coils and through which the reduced ends of the plungers extend, a pivoted switch arm alternately acted upon by said plungers and switch closing devices controlled by said switch arm, said reduced ends of the plungers being provided with hardened tips.

11. An electric switch comprising two coils adapted to be alternately energized, plungers reciprocable in said coils, a switch arm unattached to the plungers and pivoted between its ends between said plungers and adapted to be alternately struck by said plungers to swing it in opposite directions on its pivot, circuit closing means controlled by said switch arm, and buffers carried by the switch arm one at each side of the pivot of said arm for contact by said plungers.

In testimony, that I claim the foregoing as my invention I affix my signature in the presence of two witnesses, this 2nd day of June A. D. 1910.

CHESTER H. THORDARSON.

Witnesses:
W. L. HALL,
WILLIAM GOLDBERGER.